United States Patent [19]

Surovikin et al.

[11] 4,372,936

[45] Feb. 8, 1983

[54] PROCESS FOR PRODUCING CARBON BLACK

[76] Inventors: Vitaly F. Surovikin, ulitsa Lermontova, 20, kv. 80; Alexandr R. Rogov, ulitsa Volochaevskaya, 15-e, kv. 24; Gennady V. Sazhin, ulitsa 50-letia Komsomola, 8, kv. 33; Georgy L. Gorjunov, ulitsa Truda, 10, kv. 82, all of Omsk, U.S.S.R.

[21] Appl. No.: 70,791

[22] Filed: Aug. 29, 1979

[51] Int. Cl.$^3$ .................... C01B 31/02; C09C 1/48
[52] U.S. Cl. .................... 423/450; 423/449
[58] Field of Search ............ 423/450, 449; 422/150

[56] References Cited

U.S. PATENT DOCUMENTS

| | | | |
|---|---|---|---|
| 2,672,402 | 3/1954 | Stokes | 423/450 |
| 3,369,870 | 2/1968 | Ganz et al. | 423/450 |
| 4,206,192 | 6/1980 | Austin et al. | 423/450 |
| 4,261,964 | 4/1981 | Scott et al. | 423/450 |

FOREIGN PATENT DOCUMENTS

| | | | |
|---|---|---|---|
| 779854 | 3/1968 | Canada | 423/450 |
| 925914 | 5/1963 | United Kingdom | 423/450 |
| 963526 | 7/1964 | United Kingdom | 423/450 |
| 991483 | 5/1965 | United Kingdom | 423/450 |

*Primary Examiner*—O. R. Vertiz
*Assistant Examiner*—Gregory A. Heller
*Attorney, Agent, or Firm*—Lilling & Greenspan

[57] ABSTRACT

A process for producing carbon black comprises combustion of a fuel with air to form a stream of products of complete combustion of the fuel, whereinto a hydrocarbon feedstock is then added. The hydrocarbon feedstock is decomposed by absorption of heat from the combustion products, with the formation of a carbon black containing effluent. A portion of the carbon black containing effluent is collected and the remaining portion of the carbon black containing effluent is quenched by introducing a cooling agent thereinto. Thereafter carbon black is recovered from the remaining portion of the carbon black containing effluent. The collected portion of the carbon black containing effluent is fed, according to the invention, into the combustion chamber as fuel.

8 Claims, 2 Drawing Figures

PROCESS FOR PRODUCING CARBON BLACK

The present invention relates to the production of compositions of matter by way of thermal or thermal-oxidative decomposition of a hydrocarbon feedstock and, more particularly, to a process and apparatus for the production of carbon black.

The present invention can find its most successful use in the production of oil furnace carbon black employed as a reinforcing filler in the manufacture of tires and industrial rubber goods.

Known in the art is a process for producing carbon black by way of thermal decomposition of a liquid hydrocarbon feedstock. The process involves burning the fuel in the presence of oxygen to form a high-temperature stream of total combustion products. A hydrocarbon feedstock is fed into the stream of products resulting from total combustion of the fuel, and is decomposed by absorbing the heat from the combustion products, to form a carbon black containing effluent.

Thereafter, the carbon black containing effluent is quenched by passing a cooling agent therethrough and carbon black is separated from the reaction gases. A portion of the reaction gases is cooled to condense water vapor contained therein and then fed into combustion chamber as a fuel.

An apparatus intended for carrying-out said prior art process for producing carbon black is composed of a combustion chamber and a reaction chamber successively mounted and communicating therebetween. The combustion chamber is provided with means for supplying oxygen and a portion of reaction gases, wherefrom water vapor is removed by cooling. The reaction chamber is provided with a nozzle for the feedstock supply and at least one nozzle for the supply of a cooling agent. The combustion chamber and the reaction chamber are formed by a refractory lining provided in the reactor housing (cf. U.S. Pat. No. 2,672,402 Cl. 23-209.8).

The prior art process for producing carbon black using the above-described apparatus, necessitates high expenses for cooling a portion of the reaction gases and its subsequent heating in the combustion chamber. The metal means for cooling the portion of the reaction gases fed afterwards into the combustion chamber as a fuel, rapidly deteriorates.

Known is a process for producing carbon black which comprises combustion of a fuel with air in substantial excess of the stoichiometric to form a stream from products of the complete combustion of the fuel. A hydrocarbon feedstock is then fed into the stream of the products of the complete combustion of the fuel. The hydrocarbon feedstock is decomposed by absorption of heat from the hot combustion gases with the formation of the carbon black containing effluent. A portion of the carbon black containing effluent is collected and recycled to the decomposition zone of the hydrocarbon feedstock. Recycle of the carbon black containing effluent is effected by injection with the stream of products resulting from complete combustion of the fuel. The remaining portion of the carbon black containing effluent is quenched by injecting cooling water thereinto. Afterwards, carbon black is recovered from the carbon black containing effluent.

An apparatus for carrying out this prior art process for producing carbon black consists of a combustion chamber and a reaction chamber successively mounted within a hollow housing of the reactor and communicating with each other. The reactor has a pipe for collection of the carbon black containing effluent from the reaction chamber and injection thereof into the initial down-stream part of the reactor into the feedstock decomposition zone. The combustion chamber is provided with means for supplying fuel and air, as well as a nozzle for feeding the feedstock thereinto.

The reaction chamber is provided with a nozzle for the supply of a cooling agent. One end of the pipe for collection of the carbon black containing effluent is connected with the last downstream part of the reaction chamber and positioned prior to the nozzle for the supply of the cooling agent. Another end of the pipe is connected with the initial downstream part of the reaction chamber of the apparatus (cf. U.S. Pat. No. 3,645,685 Int.Cl. C 09 c 1/50).

In this prior art process and apparatus for producing carbon black the amount of air applied into the combustion chamber of the reactor for burning the fuel is substantially higher than the stoichiometric value (150%). The result is that the products of complete combustion contain free oxygen which reacts with a portion of the hydrocarbon feedstock to form carbon monoxide and carbon dioxide. As a result, the total yield of carbon black is insufficient.

The total yield of carbon black means the yield of carbon black as calculated per total mass of the feedstock and hydrocarbon fuel employed in the process. The yield of carbon black per total mass of the fuel and feedstock is the most objective measure of the process efficiency taking into account a recent price increase for natural and petroleum gases as well as for liquid feedstock of petroleum origin. Due to this price increase, the share of expenses for the hydrocarbon fuel has increased considerably and is comparable with expenses for the feedstock.

Furthermore, in the prior art process for producing carbon black, during the supply of the collected portion of the carbon black containing effluent into the feedstock decomposition zone, the carbon black formation process in the feedstock decomposition zone occurs in the presence of carbon black which is present in the collected portion of the carbon black containing effluent.

The result, on one hand, is an decreased dispersion and decreased degree of structure of the carbon black obtained and, on the other hand, increased polydispersity of carbon black which is undesirable from the point of view of mechanical properties of rubber mixes containing this carbon black as a filler.

The term "dispersion" of carbon black means the particle size of carbon black; the term "degree of structure" means the degree of agglomeration of carbon black particles to aggregates.

The term "polydispersity" of carbon black means size distribution of carbon black particles.

Furthermore, in the above-described prior art reactor it is rather difficult to control the amount of the collected portion of the carbon black effluent, since collection of this portion is effected by means of injection with the stream of combustion products supplied from the combustion chamber to the reaction chamber.

It is the main object of the present invention to provide a process for producing carbon black and an apparatus to ensure production of carbon black having a high degree of structure.

Another important object of the present invention is to provide a process for producing carbon black and an apparatus to ensure a relatively high total yield of carbon black.

It is still another object of the present invention to provide a process for producing carbon black and an apparatus which makes it possible to control the amount of the collected portion of the carbon black containing effluent.

These objects are accomplished by a process for producing carbon black, wherein a fuel is combusted with air to form a stream of products from the complete burning of the fuel. Thereafter a hydrocarbon feedstock is introduced into the stream of products of the complete combustion of the fuel and a carbon black containing effluent is formed by thermal decomposition of the hydrocarbon feedstock in the stream of products of the complete combustion of the fuel. A portion of the carbon black containing effluent is collected, and the remaining portion of the carbon black containing effluent is quenched by introducing a cooling agent thereinto. The carbon black is then recovered from the remaining portion of the carbon black containing effluent. In accordance with the present invention, the collected portion of the carbon black containing effluent is injected into the combustion zone as a fuel.

The use of high-temperature carbon black containing effluent as a fuel makes it possible to reduce the amount of hydrocarbon fuel with high heating value or completely eliminate same from the process. As a result, the process efficiency is increased due to an increased total yield of carbon black. The degree of structure of the resulting carbon black is also increased.

On the other hand, the use of the carbon black containing effluent as a fuel with a heating value substantially lower than that of the hydrocarbon fuel makes it possible to reduce the amount of excess air supplied into the combustion chamber. The supply rate of air approaches the stoichiometric value, while the temperature in the combustion chamber is not high enough to threaten the stability of the refractory lining of the combustion chamber.

Furthermore, the supply of high-temperature carbon black containing effluent as a fuel into the combustion chamber makes it possible to utilize its physical heat for decomposition of the hydrocarbon feedstock. As a result, the total yield of carbon black is increased.

It is preferable that the collected portion of the carbon black containing effluent being fed into the combustion zone be of from about 2 to about 26% by volume.

The minimum amount (2% by volume) of recycled carbon black containing effluent is defined by the necessity of ensuring an adequate amount of heat for decomposition of the hydrocarbon feedstock.

Increasing the amount of recycled carbon black containing effluent above 26% by volume will have a minimal effect on the total carbon black yield due to the increase in the amount of carbon black burnt in the combustion chamber.

It is preferable that the portion of the carbon black containing effluent being fed into the combustion chamber be injected with air under a pressure of from 5 to 10 atm.g.

This improves the conditions of burning the recycled portion of the carbon black containing effluent.

Furthermore, the use of compressed air for the supply of the collected portion of the gas-carbon products makes it possible to easily control the amount of this portion. The limits of variation in the air pressure correspond to optimal conditions of operation of the injection means.

The above-mentioned objects of the present invention are also accomplished by an apparatus for carrying out the process for producing carbon black which comprises a hollow housing communicating with a combustion chamber with means for the supply of a fuel and air thereinto and a reaction chamber with at least one nozzle for the supply of a cooling agent and at least one nozzle for the supply of a hydrocarbon feedstock into the stream of products of complete combustion of the fuel, and at least one pipe communicating with the cavity of the apparatus housing and intended for collection of a portion of the carbon black containing effluent from the reaction chamber and introduction thereof into the cavity of the apparatus housing prior to the collection zone. In accordance with the present invention, one end of the pipe is positioned before the nozzle for the cooling agent supply, while the other end is connected to the combustion chamber, and an injection means is provided communicating with said pipe and mounted in the vicinity of said other end thereof.

The connection of the other end of said pipe for collection of a portion of the carbon black containing effluent to the combustion chamber through an injection means makes possible for supplying a portion of the carbon black containing effluent into the combustion chamber and controlling the amount of this portion by varying the parameters of air supplied into said injection means.

It is preferable that the injection means have a receiving chamber for the carbon black containing effluent communicating with a mixing chamber for intermixing the carbon black containing effluent with air, both being located within the apparatus housing, and a nozzle for air supply into said mixing chamber mounted inside the receiving chamber along the longitudinal axis of said mixing chamber.

This arrangement of the injection means ensures an efficient utilization of air supplied into the injection means for the purpose of delivering said portion of the carbon block containing effluent into the combustion chamber.

It is preferable that in the apparatus housing having a refractory lining, in accordance with the present invention said pipe for collecting a portion of the carbon black containing effluent and introducing it into the combustion chamber, as well as the receiving chamber and mixing chamber of the injection means be arranged in the refractory lining of the apparatus housing.

This ensures reduced heat losses of the portion of the carbon black containing effluent delivered to the combustion chamber and an efficient utilization of the physical heat of said products in the process.

As a result, the amount of the portion of the carbon black containing effluent supplied into the combustion chamber is reduced and the total yield of carbon black is increased. Furthermore, the metal deterioration of the reactor is lowered.

The use of the process and apparatus for producing carbon black according to the present invention makes it possible to increase the total yield of carbon black when producing carbon black with different degrees of dispersity. Besides, the use of the process and apparatus according to the present invention ensures the production of carbon black with a high degree of structure.

The above-mentioned and other features and advantages of the present invention become more fully apparent from the following detailed description of its particular embodiment with reference to the accompanying drawings, wherein.

Figure 1:
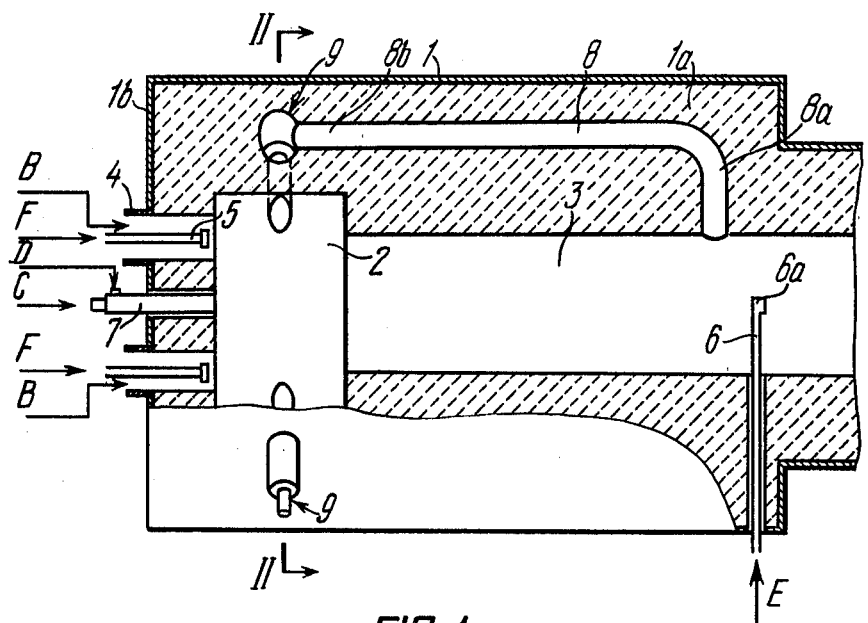
FIG. 1 is a schematical view of the apparatus for carrying out the process for producing carbon black in accordance with the present invention, partial elevation.

In practicing the process for producing carbon black in accordance with the present invention, a fuel is combusted with air to form a stream of products of complete combustion of the fuel.

Into this high-temperature stream of products of complete combustion of the fuel a hydrocarbon feedstock is fed which is decomposed by absorbing heat from the combustion gases with the formation of a carbon black containing effluent.

A portion of said carbon black containing effluent in an amount of from about 2 to about 26% by volume is collected and fed into the combustion chamber as a fuel by way of injection with air under a pressure of from about 5 to about 10 atm.abs. Said combustion of a portion of the carbon black containing effluent as a fuel results in an increased degree of structure of carbon black and higher total yield of carbon black.

Thereafter, the remaining portion of the carbon black containing effluent is quenched by introducing a cooling agent thereinto. In the present case, water is used as the cooling agent.

Afterwards, carbon black is recovered from the remaining portion of the carbon black containing effluent by any conventional method suitable for this purpose which does not constitute the subject matter of the present invention.

The process for producing carbon black according to the present invention will be now more fully apparent from the following detailed description of an apparatus intended for carrying out said process, and the operation of said apparatus.

An apparatus for carrying out the process for producing carbon black according to the present invention has a housing 1 (FIG. 1) of a cylindrical shape provided with a refractory lining 1a. In the housing 1 there are successively and coaxially mounted a cylindrical combustion chamber 2 communicating with a reaction chamber 3. The reaction chamber 3 has a diameter smaller than the diameter of the combustion chamber 2.

The apparatus is also provided with means for supplying fuel and air into the combustion chamber 2 which comprise four pipes 4 for air and four burners 5 for fuel mounted along the longitudinal axis of pipes 4 so that their axes are in parallel to the longitudinal axis of the housing 1. Pipes 4 and burners 5 are secured in a cover 1b of the housing 1 and located symmetrically relative to the longitudinal axis of the housing 1.

In the reaction chamber 3 there is a nozzle 6 for the supply of cooling water which is radially mounted at one end of the reaction chamber 3 and fixed to the housing 1. The outlet tip 6a of the nozzle 6 is mounted along the longitudinal axis of the housing 1 and directed down-stream relative to the carbon black containing effluent.

In the reactor there is a feedstock supply nozzle 7 mounted along the longitudinal axis of the housing 1 and fixed in the cover 1b of the housing 1.

The reactor has three pipes 8 for collecting a portion of the carbon black containing effluent located symmetrically relative to the longitudinal axis of the housing 1. One end 8a of each pipe 8 is positioned radially relative to the reaction chamber 3 and connected with the latter prior to the nozzle 6.

In accordance with the present invention, the other end of each pipe 8 is connected with the combustion chamber 2.

Figure 2:
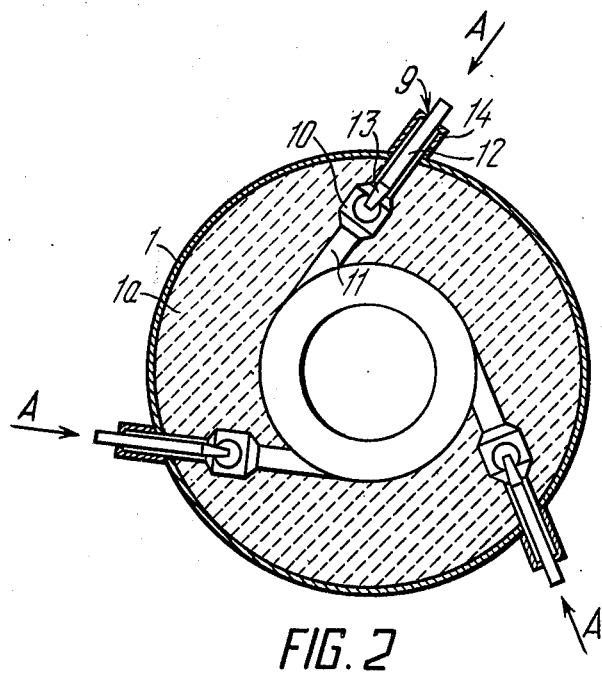
FIG. 2 is a cross-section view of II—II in FIG. 1.

In the vicinity of the other end 8b of every pipe 8 there are provided three injection means 9 (FIG. 2). The injection means 9 have a receiving chamber 10, a mixing chamber 11 and a nozzle 12 for supplying air, said receiving chamber, mixing chamber and the nozzle being mounted coaxially. The receiving chamber 10 communicates with the mixing chamber 11 and with the combustion chamber 2.

The pipe 8 is positioned radially relative to the receiving chamber 10 and communicates therewith.

The air supply nozzle 12, the outlet tip 13 which is arranged in the form of a Laval's nozzle is mounted inside the receiving chamber 10 and fixed in a pipe 14 of the housing 1. The injection means 9 are located so that their longitudinal axes are tangential with respect to the combustion chamber 2 generatrix.

The pipes 8, as well as receiving chambers 10 and mixing chambers 11 of said injection means 9, are located in the refractory lining 1a of the reactor housing 1.

Operation of the apparatus according to the present invention is as follows.

Into the nozzles 12 of every injection means 9 compressed air is fed along the arrow A (FIG. 2) under a pressure ranging from 5 to 10 atm.abs. The air stream from the outlet tip 13 of the nozzle 12 is passed into the mixing chamber 11 and creates a rarefaction in the receiving chamber 10 of the injection means 9. As a result, the carbon black containing effluent is fed to the receiving chamber 10 through the pipe 8 from the reaction chamber 3 and mixed in the chamber 11 with the air stream.

The resulting mixture of air with the carbon black containing effluent is further delivered to the combustion chamber 2 and the combustible components of the carbon black containing effluent is burned with the formation of a stream of products of the complete combustion of the fuel. To ensure complete burning of the combustible components of the carbon black containing effluent, air is fed into the combustion chamber 2 through the pipes 4 in the direction of the arrow B (FIG. 1).

Into the stream of the products of complete combustion of the fuel passed into the reaction chamber 3 an atomized hydrocarbon feedstock is fed along the arrow C through the feedstock nozzle 7. To ensure a better atomization of the feedstock, compressed air is also fed into the nozzle 7 along the arrow D. As the feedstock use can be made of oil or coal refining products.

In the reaction chamber 3 the hydrocarbon feedstock is decomposed by absorbing heat from the products of complete combustion of the fuel, with the formation of a carbon black containing effluent. A portion of the carbon black containing effluent in an amount ranging from about 2 to about 26% by volume is fed to combustion as a fuel. The remaining portion of the carbon black containing effluent is quenched by introducing atomized water thereinto through the nozzle 6 along the arrow E.

The cooled carbon black containing effluent is withdrawn from the reactor and carbon black is recovered from the remaining portion of the carbon black containing effluent by any conventional method suitable for this purpose.

During the period of warming-up the reactor and bringing it under conditions of carbon black formation, a hydrocarbon fuel (propane-butane mixture) is fed into the combustion chamber through burners 5 along the arrow F. After supply of the feedstock into the reactor and formation of the carbon black containing effluent, the hydrocarbon fuel supply is minimized or completely stopped.

EXAMPLE 1

Air under pressure of 5.5 atm.abs. is fed into the nozzles 12 of the injection means 9. The total amount of air supplied into three nozzles 12 is 105 nm³/hr, i.e. 105 m³/hr under normal conditions. As a result of air injection, a portion of the carbon black containing effluent in the amount of 2.03% by volume is passed into the receiving chambers 10 from the reaction chamber 3 through the pipes 8. The collected portion of the carbon black containing effluent is mixed with air in the mixing chamber 11 and then passed into the combustion chamber 2. Air for burning in the amount of 1,750 nm³/hr at a temperature of 250° C. is fed into the chamber 2 through the pipes 4.

As a result of combustion of combustible components of the collected portion of the carbon black containing effluent with air, a stream of products of complete combustion of the fuel is formed. Into said stream of products of complete combustion of the fuel fed into the reaction chamber 3 an atomized hydrocarbon feedstock preheated to temperature of 180° C. is admitted in the amount of 500 kg/hr.

To ensure atomization of the feedstock, air is fed into the nozzle 7 under pressure of 8 atm.abs. in the amount of 300 nm³/hr.

The feedstock employed is a commercial hydrocarbon feedstock with correlation index of 120.

In the reaction chamber 3 the hydrocarbon feedstock is decomposed at temperature of 1,550° C. with the formation of the carbon black containing effluent. A portion of said carbon black containing effluent in the amount of 2.03% by volume, or 0.1 Nm³ per 1 kg of the feedstock, is delivered into combustion chamber as a fuel.

The remaining portion of the carbon black containing effluent is quenched to temperature of 650° C. by way of introducing, through the nozzle 6, atomized water under pressure of 15 atm.abs. thereinto.

The cooled carbon black containing effluent is withdrawn from the reactor and then carbon black is recovered from the remaining portion of the carbon black containing effluent.

The total yield of carbon black is 42.2% by weight. The resulting carbon black has the specific surface area of 72.4 m²/g and dibutylphthalate absorption of 138 ml/100 g.

The term "dibutylphthalate absorption" characterizes the degree of aggregation of carbon black particles (degree of structure) and corresponds to a minimum amount of dibutylphthalate necessary for complete wetting of carbon black particles (when the total weighed mass of carbon black can be collected on a glass spattle). Absorption of dibutylphthalate is determined in the following manner: about 0.5 g of carbon black weighed with the accuracy of up to 0.01 g is placed into a porcelain cup and dibutylphthalate is dropwise added thereto from a microburette. After each drop the mixture of carbon black and dibutylphthalate is thoroughly rubbed with a spattle till all traces of dibutylphthalate are removed from the cup walls. The addition of dibutylphthalate is stopped at the moment when all carbon black is collected on the spattle and a tablet thus prepared is not broken after being subjected to light compression.

Dibutylphthalate absorption (X) expressed in ml/100 g is calculated from the formula: $X = 200 \times V$, wherein V is a volume of absorbed dibutylphthalate, in ml.

The term correlation index relates to the content of aromatic compounds in the hydrocarbon feedstock. More specifically, it expresses the relationship between the feedstock density and boiling point according to the formula:

$$CI = 473.7 \, d - 456.8 + (48640/T)$$

wherein
CI is correlation index;
d-feedstock density at 16° C., g/cm³;
T-average molecular boiling point, °K.

EXAMPLE 2

Into the nozzles 12 of the injection means 9 air is fed under a pressure of 7 atm.abs. The total air amount supplied into three nozzles 12 is equal to 270 nm³/hr. As a result of air injection, a portion of the carbon black containing effluent in the amount of 4.34% by volume is fed into the receiving chambers 10 from the reaction chamber 3 through the pipes 8. The collected portion of the carbon black containing effluent is mixed with air in the mixing chamber 11 and then passed into the combustion chamber 2. Into the combustion chamber 2 air for burning is supplied in the amount of 1,000 nm³/hr at a temperature of 250° C. through the pipes 4. Combustion of combustible components of the collected portion of the carbon black containing effluent results in the formation of a stream of products of complete combustion of the fuel. Feedstock supply into the stream of products of complete combustion of the fuel and decomposition thereof are performed under conditions similar to those described in the foregoing Example 1. A portion of the resulting carbon black containing effluent in the amount of 4.34% by volume, or 0.154 nm³ per 1 kg of the feedstock, is further fed into combustion chamber as a fuel.

The remaining portion of the carbon black containing effluent is quenched and carbon black is recovered therefrom following the procedure described in Example 1.

The total yield of carbon black is 54.1% by weight. The resulting carbon black has a specific surface area of 75 m²/g and dibutylphthalate absorption of 146 ml/100 g.

EXAMPLE 3

Into the nozzles 12 of the injection means 9 air is supplied under a pressure of 8.5 atm.abs. The total amount of air fed into the three nozzles 12 is 315 Nm³/hr. As a result of air injection, a portion of carbon black containing effluent in the amount of 16% by volume is passed into the receiving chambers 10 from the reaction chamber 3 through the pipes 8. The collected portion of the carbon black containing effluent is mixed in the mixing chamber 11 with air and then fed into the combustion chamber 2. Through the pipes 4 air is fed into the combustion chamber for burning in the amount of 880 Nm$^3$/hr at a temperature of 250° C.

As a result burning of combustible components of the collected portion of the carbon black containing effluent a stream of products of complete combustion of the fuel is formed. The feedstock supply into the reactor decomposition thereof are carried out under conditions similar to those described in Example 1.

A portion of the resulting carbon black containing effluent in the amount of 16% by volume, or 0.615 Nm$^3$ per 1 kg of the feedstock, is fed into the combustion chamber as a fuel.

The remaining portion of the carbon black containing effluent is quenched and carbon black is recovered therefrom following the procedure described in the foregoing Example 1.

The total yield of carbon black is 58.4% by weight. The resulting carbon black has the specific surface area of 73.5 m$^2$/g and dibutylphthalate absorption of 148 ml/100 g.

EXAMPLE 4

Into the nozzles 12 of the injection means 9 air is fed under a pressure of 9.5 atm.abs. The total amount of air supplied into three nozzles 12 is 500 Nm$^3$/hr. As a result of air injection a portion of carbon black containing effluent in the amount of 25.5% by volume is passed into the receiving chambers 10 from the reaction chamber 3 through the pipes 8.

The collected portion of the carbon black containing effluent is mixed in the mixing chamber 11 with air and passed into the combustion chamber 2. Air for burning in the amount of 660 Nm$^3$/hr at a temperature of 250° C. is fed into the combustion chamber 2 through the pipes 4.

As a result of combustion of combustible components of the collected portion of the carbon black containing effluent with air, a stream of products of complete combustion of the fuel is formed. The feedstock supply into the reactor and decomposition thereof are performed following the procedure described in Example 1.

A portion of the resulting carbon black containing effluent in an amount of 25.5% by volume, or 1.0 Nm$^3$ per 1 kg of the feedstock, is fed into the combustion chamber as a fuel. The remaining portion of the carbon black containing effluent is quenched and carbon black is recovered therefrom under conditions similar to those described in Example 1 hereinbefore.

The total yield of carbon black is 56.7% by weight. The resulting carbon black has a specific surface area of 71 m$^2$/g and absorption of dibutylphthalate of 150 ml/100 g.

EXAMPLE 5

This Example illustrates a prior art process for producing carbon black with the use of a hydrocarbon fuel.

Air for burning in the amount of 2,280 Nm$^3$/hr at the temperature of 250° C. is passed through the pipes 4, while through the burners 5 an hydrocarbon fuel is passed in the amount of 50 Nm$^3$/hr.

As the hydrocarbon fuel use is made of a propane-butane mixture in a volumetric ratio of 1:1. As a result of combustion of the hydrocarbon fuel with air in the combustion chamber 2, a stream of products of complete combustion of the fuel is formed.

The feedstock supply into the reactor and decomposition thereof, as well as quenching of the resulting carbon black containing effluent are carried out following the procedure described in Example 1.

The total yield of carbon black is 39.4% by weight. The resulting carbon black has a specific surface area of 74 m$^2$/g and dibutylphthalate absorption of 126 ml/100 g.

As follows from the above-given Examples, the process and apparatus for producing carbon black according to the present invention provides a considerable increase in the total yield of carbon black as calculated per the total mass of the employed hydrocarbon feedstock and fuel. The need in hydrocarbon fuel is substantially reduced.

Furthermore, the process and apparatus for producing carbon black according to the present invention ensure a substantial increase of the degree of structure of carbon black (as determined by the value of dibutylphthalate absorption).

It is to be understood that the persons skilled in the art can introduce various modifications into the process and apparatus for producing carbon black described hereinabove as a non-limiting Example, without, however, falling beyond the scope of the present invention.

What is claimed is:

1. A process for producing carbon black, comprising:
combusting a first fuel with air to form a high temperature stream of products of complete combustion of the fuel;
introducing a hydrocarbon feedstock into said high temperature product stream, said temperature being sufficient to cause thermal decomposition of the hydrocarbon feedstock and the formation of a hot carbon black containing effluent;
recycling about 2 to 26 volume % of the hot carbon black containing effluent, without cooling, to the combustion step as a second fuel to completely replace the first fuel, wherein the the heat of the second fuel is utilized to decompose the hydrocarbon feedstock, and whereby the total yield of carbon black is increased;
introducing a cooling agent into the remaining carbon black effluent product stream, and recovering the carbon black product.

2. The process of claim 1, wherein the cooling agent is water.

3. The process of claim 2, wherein the water is atomized.

4. The process of claim 1, wherein the first fuel is a propane-butane mixture.

5. The process of any of claim 1, wherein the hydrocarbon feedstock is introduced in an atomized state.

6. The process of any of claim 1, wherein the decomposition temperature is about 1550° C., and the cooling temperature is about 650° C.

7. The process of any of claim 1, wherein the amount of air for combustion is less than the stoichiometric value.

8. A process as claimed in claim 1, wherein the portion of the carbon black containing effluent fed to the combustion step is injected with air under a pressure ranging from about 5 to about 10 atm.abs.

* * * * *